United States Patent [19]

Duncan

[11] 3,747,312
[45] July 24, 1973

[54] NONSELECTIVE ASPARAGUS HARVESTER

[76] Inventor: John D. Duncan, Rural Rt. No. 1, Kiona, Wash.

[22] Filed: Aug. 25, 1971

[21] Appl. No.: 174,851

[52] U.S. Cl. ................................ 56/327 A, 56/246
[51] Int. Cl. .......................................... A01d 45/00
[58] Field of Search ...................... 56/327 A, 327 R, 56/155, 246–248, 293

[56] References Cited
UNITED STATES PATENTS

| | | | |
|---|---|---|---|
| 3,581,483 | 6/1971 | Kohl | 56/327 A |
| 3,587,215 | 6/1971 | Porter | 56/327 A |
| 3,624,990 | 12/1971 | Sinden et al. | 56/327 A X |
| 2,492,290 | 12/1949 | Isserstedt | 56/293 X |

*Primary Examiner*—Antonio F. Guida
*Assistant Examiner*—J. N. Eskovitz
*Attorney*—Keith S. Bergman

[57] ABSTRACT

A mechanism to nonselectively cut all asparagus stocks above a certain elevation in a given area and present the cut spears for further processing. The mechanism is attached to a tractor for locomotion and power. It provides an oscillating, crenated cutting bar located between the tractor wheels for adjustable vertical positioning with plural pickup rolls therebehind to transfer cut asparagus spears on a soil bed to a rearward transit conveyor which separated the soil and transfers the asparagus spears to an elevating conveyor from which they are disposed for sorting and packing. The crenate configuration and reciprocating motion of the cutting blade provides a self-sharpening reaction in abrasive soil. The mechanism provides fine vertical adjustment of the cutter relative the earth's surface.

7 Claims, 11 Drawing Figures

PATENTED JUL 24 1973 3,747,312

JOHN D. DUNCAN, INVENTOR.

BY

ATTORNEY

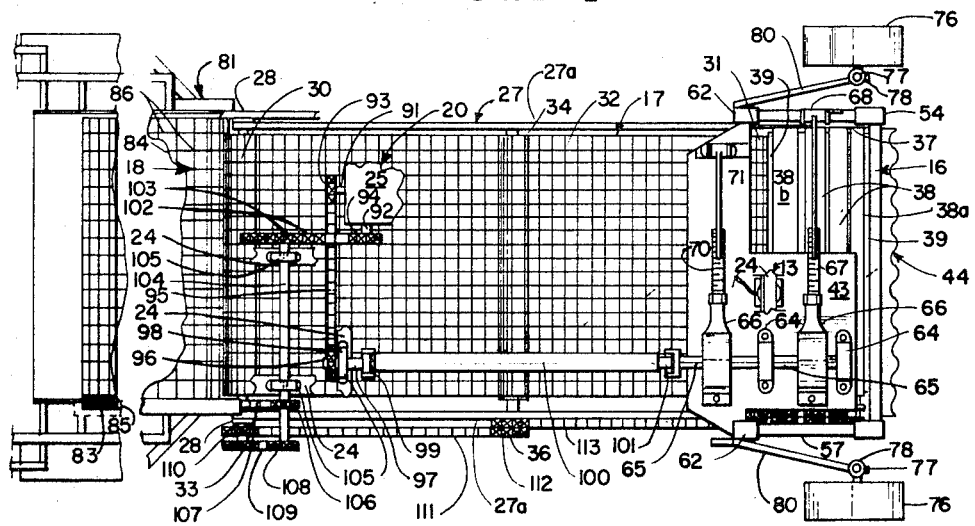
FIGURE 4
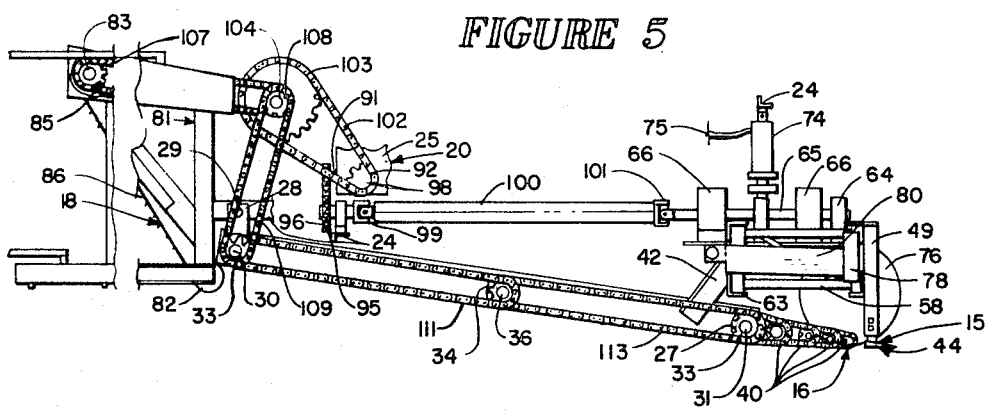
FIGURE 5
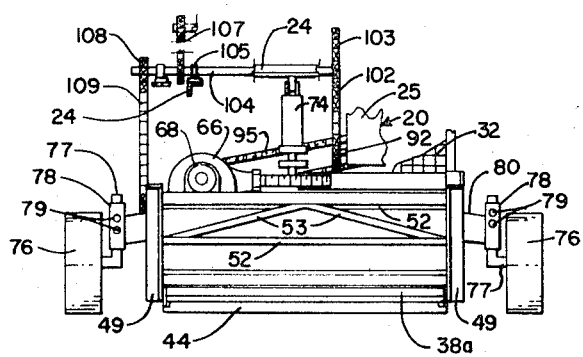
FIGURE 6
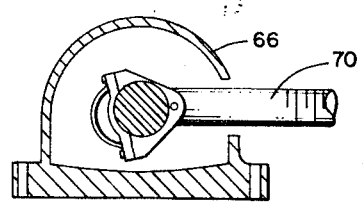
FIGURE 8
JOHN D. DUNCAN, INVENTOR.
ATTORNEY

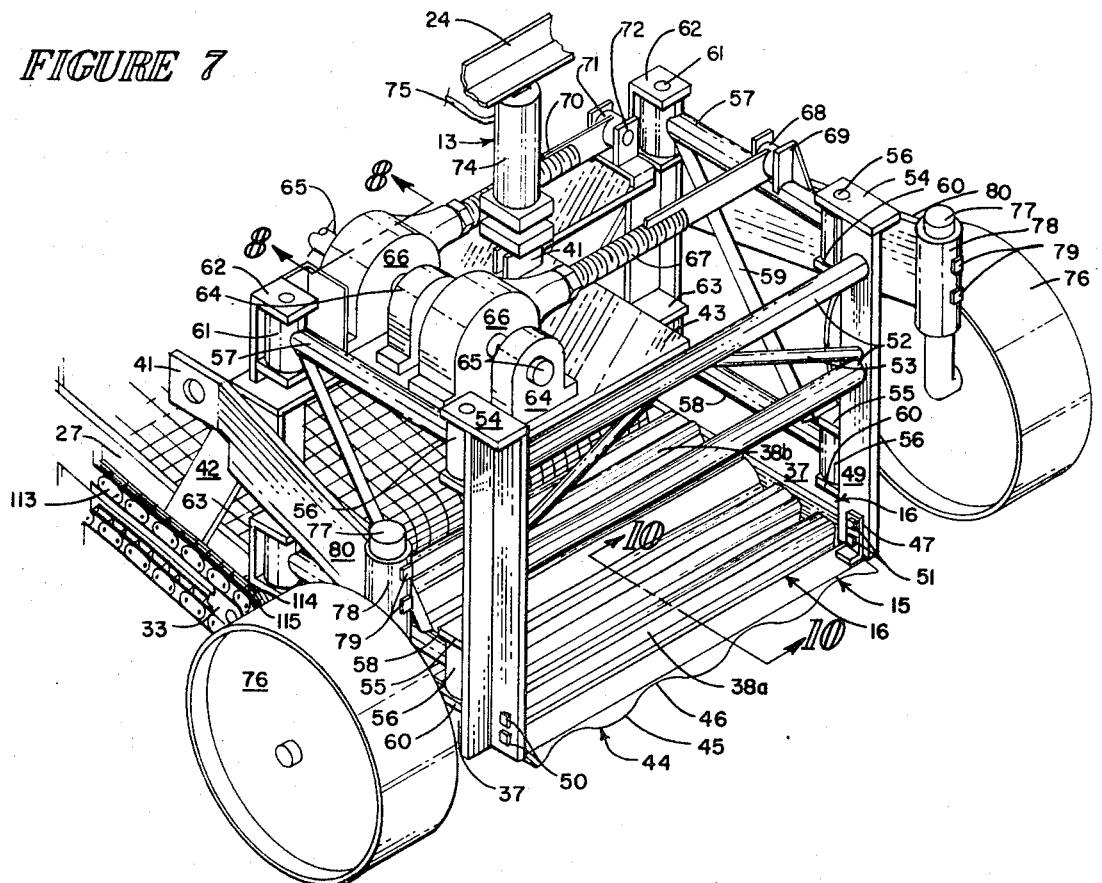
FIGURE 7
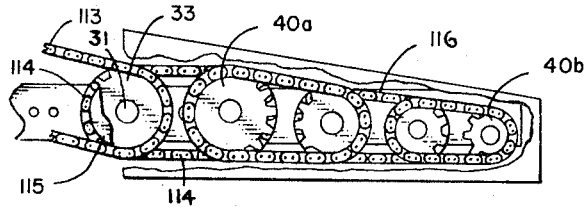
FIGURE 9
FIGURE 11
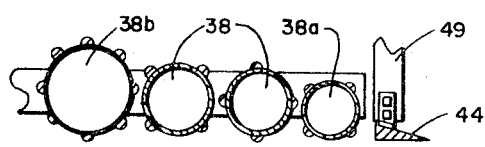
FIGURE 10
JOHN D. DUNCAN, INVENTOR.
BY 
ATTORNEY

NONSELECTIVE ASPARAGUS HARVESTER

BACKGROUND OF INVENTION

RELATED APPLICATIONS

There are no applications related hereto now filed in this or any foreign country.

FIELD OF INVENTION

This invention relates generally to asparagus harvesters and more particularly to such a harvester with a nonselective cutter having a self-sharpening, reciprocating, crenate cutting blade finely adjustable for vertical position relative the earth's surface.

DESCRIPTION OF THE PRIOR ART

Heretofore asparagus has been cut largely by hand, but with current labor economics and the scarcity of farm laborers manual harvesting has become less desirable and responsively various mechanical asparagus harvesters have become known. For convenience of consideration these harvesters may be divided into a first class of selective cutters and a second class of nonselective cutters.

Harvesters of the first class are adapted to cut only asparagus spears of certain sensible physical characteristics, normally spears of a certain height above the earth in which they grow, though some devices have sensed stock stiffness or stock diameter. Such devices must provide some means of sensing or determining position of the stock that is to be cut, some means of individually cutting this stock and some means of moving the cut stock for further processing. Each of these functions require extensive and complex mechanical apparatus and though several asparagus harvesters, including some or all of these functions, have heretofore become known they generally have not been economical, reliable, or durable and have therefore, not come into general commercial use. Such mechanisms, by reason of the complex mechanical apparatus required to perform their several functions, are quite readily distinguishable on this basis from nonselective cutters.

Nonselective cutters heretofore known have not proven popular for various reasons. Firstly, since asparagus is a dioecious plant, the progeny have shown great variation in the field even when ambient environmental conditions are substantially the same. This individual variation has caused a crop to present a medley of spears of varying heights, sizes and maturities at any given time. If such a crop be cut by nonselective methods, some spears are too short and useless and others too long and wasteful of plant energy and product quality, all to contribute to substnatial waste, oftentimes approximating 30 to 40 percent of the crop. Secondly the known nonselective cutters have not cut the asparagus in acceptable fashion. The stocks are preferably cut in the white fiberous portion an inch and a half or thereabouts below ground to lessen bleeding of the stump and liquid transpiration from the cut stock. Similarly the stock must be cleanly cut to avoid tearing the dermal layer adjacent the cut which accelerates liquid transpiration, promotes microbial deterioration, and lessens the aesthetic appeal of the product. Prior art devices have presented cutters that have not functioned well to make a clean cut of the stock at the appropriate position below the soil surface.

Recently the problem of irregular maturity of the asparagus spears has been somewhat resolved by tissue culture methods of reproduction wherein the asparagus breeder can propagate many plants having common ancestry, which, prescinding from other biological variables, tends to create a crop of greater uniformity. The tissue culture methods have developed sufficiently with asparagus that they have come to economic feasibility in producing crops that with reasonable control of biologic environmental parameters will produce spears with an average variance of not more than about an inch at any given time. Pollen propagation (aided by colchiciene) has also proven possible and may in the future be developed to a commercial scale to produce plants of the same degree of uniformity. With these improved asparagus plants that tend to produce a more homogenous crop, the nonselective cutting of asparagus again has become of interest and appears now to be economically feasible.

The instant invention provides such a nonselective cutter that alleviates the problems experienced in the prior art. A crenate cutter blade is provided to oscillate in a lateral direction, parallel to the blade length to provide a more effective cutting action upon the asparagus stock that does not tear the dermal coat and to cause an abrasive reaction in the soil that tends to sharpen the edge of the blade. The harvester mechanism is vehicle mounted for locomotion with the cutter mechanism between the vehicle wheels to provide a very accurate adjustment of the cutting plane, especially responsive to small, local topographical variations. The cut spear pickup mechanism initially transports the spears upon a bed of soil that is later removed on the transport screen to assure safe pickup without physical injury that would lower the grade of the harvested product. A sorting-packing station is provided to allow this operation to be carried out in the field immediately after cutting. These functions are all carried out by mechanically simple apparatus that is of a reliable, durable and ecomomic nature.

SUMMARY OF INVENTION

My invention provides an asparagus harvester that is supported, propelled and powered by some vehicle such as a wheeled tractor. A transisting conveyor extends forwardly from pivotable communication with the main tractor frame at the rear axle. The forwardmost portion of the frame of this conveyor extending to a point between the forward wheels of the tractor, carries plural pickup cylinders adapted to receive cut asparagus spears on a bed of earth and transport the whole rearwardly thereover to the immediately rearward principal transit conveyor. The transit conveyor has a mesh type belt to allow gravity passage of the supporting soil therethrough, aided if necessary by an eccentric agitator. The rearward portion of the transit conveyor communicates with the elevating conveyor in a fashion to transfer cut asparagus spears thereto. This conveyor transports the spears upwardly and rearwardly to a sorting table carried in the rearwardmost part of the tractor, with appropriate ancillary structures, to allow one or more sorter-packers to operate upon the cut spears in furtherance of the processing procedure.

The forward part of the transit conveyor frame pivotably supports the auxillary cutter frame immediately forwardly of the pickup member. This frame extends forwardly to pivotably mount the depending crenate cutter bar at a level slightly below the lowermost portion of the pickup member. An eccentric type mechanical linkage operatively communicates between conveyor frame and cutter bar frame to cause a lateral oscillatory motion in the cutter bar.

A hydraulic cyclinder communicates between the principal tractor frame and the conveyor frame to regulate the distance therebetween and thusly regulate the depth of the cutter bar in the earth therebeneath. Paired opposed, adjustable depth gauge wheels are provided on each side of the forward part of the transit conveyor frame to maintain the depth of the cutter bar relative the surface of the earth once established by the hydraulic cylinder.

Mechanical linkages powered by the supporting tractor are provided to activate the various mechanisms of the harvester.

In providing such a machine it is:

A principal object of my invention to create a nonselective asparagus harvester that may be supported and powered by a tractor type vehicle to effectively cut asparagus spears beneath the surface of the earth, pickup and transport the cut spears without damage and present them to a sorting table for further processing.

A further object of my invention to provide such a machine that has a crenate cutting blade pivotably mounted for lateral oscillatory motion parallel to its length to cause soil reaction tending to sharpen the blade and to cause a clean, effective cut of asparagus spears in the soil.

A still further object of my invention to provide such a device wherein the depth of the cutting blade in the soil therebeneath is finely controlled and maintained by cooperating mechanical linkage between tractor frame and cutter mechanism and between cutter mechanism and the earth therebeneath.

A still further object of my invention to provide such a harvester unit that may be pluralized upon a single supportive vehicle to provide a multi-rowed harvester.

A still further object of my invention to provide such a mechanism that is of a new and novel design, of rugged and durable nature, of simple and economic manufacture and one otherwise well adapted to the uses and purposes for which it is intended.

Other and further objects of my invention will appear from the following specification and accompanying drawings which form a part of this application. In carrying out the objects of my invention, however, it is to be understood that essential features are susceptible of change in design and structural arrangement with only one preferred and practical embodiment being illustrated in the accompanying drawings as required.

BRIEF DESCRIPTION OF DRAWINGS

In the accompanying drawings which form a part of this application and wherein like numbers of reference refer to similar parts throughout:

FIG. 4 is an orthographic top view of my invention isolated from the supporting and motivating tractor.

FIG. 5 is an orthographic side view, partially cutaway, of the structure illustrated in FIG. 4.

FIG. 6 is an orthographic front view, partially cutaway, of the structure illustrated in FIG. 4.

FIG. 7 is a partially cutaway, orthographic view illustrating in detail the cutting member and pickup member of my invention.

FIG. 8 is a cross sectional view through one of the eccentric journal structures that moves the cutter bar, taken on the line 8—8 of FIG. 7 in the direction indicated by the arrows thereon.

FIG. 9 is a partially cutaway view of the driving mechanism for the pickup member.

FIG. 10 is a partial cross sectional view of the pickup rolls, taken on the line 10—10 of FIG. 7 in the direction indicated by the arrows thereon.

FIG. 11 is a partial, somewhat enlarged, cross sectional view of the eccentric agitator means associated with the transport conveyor screen.

DESCRIPTION OF THE PREFERRED EMBODIMENT

Figure 1:
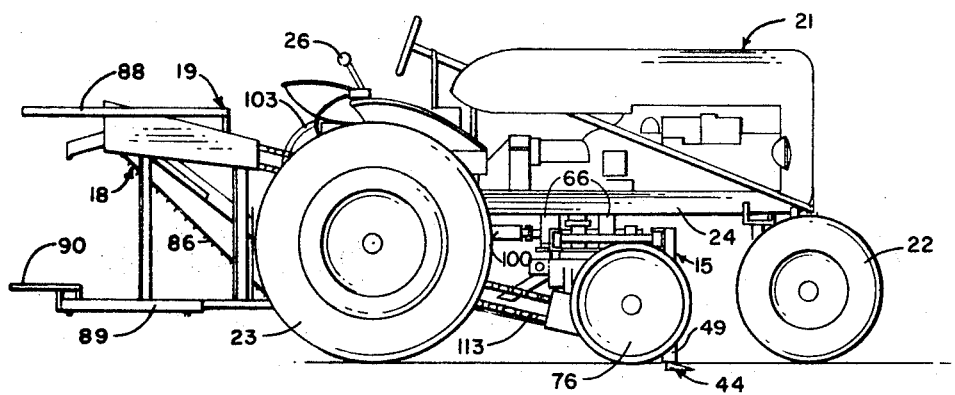
FIG. 1 is an orthographic side view of my invention in place upon a four-wheeled tractor of commerce.

REferring now to the drawings in detail, it will be seen that my invention comprises generally transit conveyor 17, pivotably mounted in its rearward part upon the principal frame of tractor 21, extending forwardly to carry cutting member 15 and pickup member 16 in its forwardmost part and communicating in its rearward part with elevating conveyor 18 to transport cut asparagus spears to sorting member 19, the whole being activated by motivating means 20 powered by the tractor.

Figure 2:
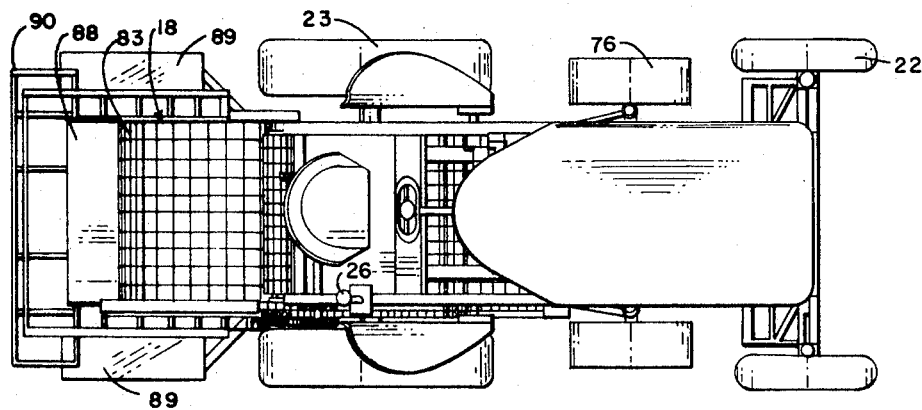
FIG. 2 is a top view of the mechanism illustrated in FIG. 1.

Referring to the drawings of FIGS. 1 and 2 there will be seen ordinary wheel tractor 21 of commerce with front wheels 22, back wheels 23, principal frame 24, power takeoff 25 and hydraulic system 26. This type of vehicle provides support, locomotion, and power for my asparagus harvester carried thereby.

In FIGS. 4 and 5 it will be seen that transit conveyor 17 is supported on a rigid peripheral frame 27 having elongate beam-like side elements 27a joined by cross pieces to form the rigid structure. The frame pivotably communicates for support by paired, opposed upwardly projecting fastening ears 28 with pins 29 carried by principal tractor frame 24. Rearward belt shaft 30 and forward belt shaft 31 are pivotally supported by appropriate bearings in the end parts of peripheral frame 27. Each shaft irrotatably carries a medial roller to operatively support screen conveyor belt 32 and one end of each shaft irrotatably carries driving cogs 33 to aid in supplying motive power to the shafts.

Eccentric shaft 34, the detail of which is seen in FIG. 11, is centrally positioned along frame 27 in appropriate bearings to provide rotatable mounting. This shaft medially carries roller 35, slightly larger than the driving roller and eccentrically mounted upon its supporting shaft, to provide a protuberance in the belt course that upon rotation will move the conveyor belt cyclically inwardly and outwardly to aid the passage of earth through its mesh. Driving cog 36 is irrotatably carried on one end part of the eccentric shaft to cooperate in rotatably moving the shaft. Screen conveyor belt 32 is of appropriate flexibility to allow the motion and configuration required of it and yet provide a mesh-like structure with voids of appropriate size to allow passage therethrough of the earth bed supporting the cut asparagus spears. Several such screens are known and commercially available.

Pickup member 16 is supported by paired opposed lateral pickup frames 37 structurally carried by the forwardmost part of peripheral frame 27 of the transit conveyor to project forwardly therefrom. The side elements are joined by cross pieces to form a rigid structure. Plural, parallel laterally extending pickup rolls 38 are journaled by appropriate bearings carried in lateral frames 37. These rolls vary in size, the forwardmost 38a being the smallest and the rearwardmost 38b being the largest. Each roll has plural, angularly spaced, elongate ridge-like protuberances 39 so sized and arranged, with a protuberance on one roll intermeshing between two protuberances on a adjacent roll so as not to interfere with each other upon rotation. Driving cogs 40 are irrotatably mounted in similar end parts of each pickup roll to cooperate in supplying motive power to the rolls.

With this structure then as the pickup rolls are rotatably driven, all in the same direction, they tend to present a substantially continuous support for dirt and cut asparagus spears over their upper surfaces and yet each roll moves to tend to transport the supported material rearwardly to the forward portion of transit conveyor 17. The smallest pickup roll 38a is of a relatively small diameter so that asparagus spears and transporting earth, or a substantial portion of it, lying above the plane of cutting will pass over the upper surface of this roll and much of this earth will thence pass over the upper surface of the entire pickup member to provide a cushioning bed of loose earth for the cut asparagus spears during initial pickup and transport.

Because of the debris laden environs in which the various bearing elements of the conveyors and pickup member must operate the bearings journaling the various rotating shafts are preferably of a sealed variety. Dirt shields may be added to the structure to lessen the concentration of debris about the various relatively movable surfaces.

As seen, especially in the orthographic view of FIG. 5 and the detailed view of FIG. 7, cutting member 15 provides auxillary cutter frame 41 supported above the forward parts of the transit conveyor and the pickup member by structural elements 42 communicating between the auxillary frame and peripheral frame 27 of the transit conveyor, thusly fixedly positioning the auxillary frame relative to transit conveyor and pickup member. The cutter frame includes level, planar element 43 of some areal extent sufficient to support the operative mechanism of the cutting member.

Figure 3:
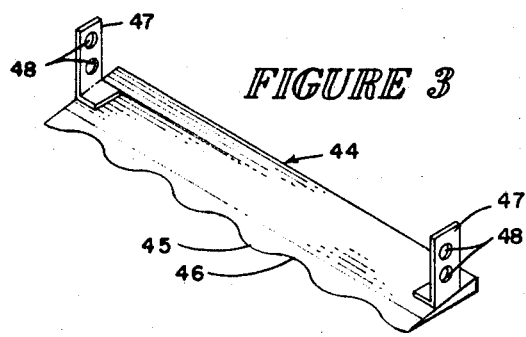
FIG. 3 is an isometric view of the cutter bar of my invention showing its crenate configuration.

Cutter bar 44, as seen in detail in FIG. 3, is an elongate structure having a triangular cross sectional configuration to provide an acute cutting edge in its forward part. The end parts of the cutter bar carry perpendicularly projecting brackets 47 having holes 48 to aid attachment to a supporting structure. The cutting edge along its linear extent is of an undulating nature having alternating arcuate protuberances 45 and indentations 46 to provide a crenate cutting edge. Preferably the blade area immediately rearwardly of the cutting edge is quite acute with edges meeting at a shallow angle of about 5° to present a cutting edge. The dimensioning of undulations appears not too critical but I prefer an arcuate configuration as illustrated with a symmetrical shape and spacing between adjacent apexes of some 2 to 4 inches. Blades of this type are known for cutting in other fields of art.

Cutter bar 44 is supported between the end parts of spaced opposed cutter bar arms 49 depending from the cutter bar frame. Plural holes 50 in the lower portion of these cutter bar arms receive nut-bolt combinations 51 extending between cutter bar brackets 47 and the cutter bar arms to allow some adjustment in vertical positioning of the cutter bar relative the cutter bar frame. The forward element of the cutter bar frame is formed by opposed cutter bar arms 49 with appropriate cross pieces 52 and angle supports 53 structurally communicating therebetween. The rearward portions of cutter bar arms 49 carry laterally extending, paired opposed upper pivot brackets 54 and lower pivot brackets 55, each carrying pins 56 to pivotably mount the side elements. Each side element of the cutter bar linkage is formed with upper cord 57 and spaced parallel lower cord 58 with angled supporting elements 59 structurally communicating therebetween. Each end of both upper cord and lower cord structurally carries rubber mounted bearings 60, the forward bearing being adapted to rotatably mount upon pins 56 of the forward frame element and the rearward bearings adapted to rotatably mount upon pins 61 carried by upper pivot brackets 62 and lower pivot brackets 63 structurally supported upon auxillary cutter bar frame 41 carried by the conveyor frame. With this structure then the forward element of the cutter ber frame may pivotably move a limited distance laterally relative the cutter bar auxillary frame and thusly also relative earth the harvester traverses.

To provide activation for the cutter bar, planar support 43 at one side mounts paired opposed bearings 64 rotatably journaling cutter bar jack shaft 65 extending therebetween and for some distance rearwardly. This jack shaft carries spaced, paired opposed eccentric bearings 66, one between journal 64 and one rearwardly thereof. The bases of eccentric bearings 66 are rigidly fastened to support 43. The eccentric element of the forward eccentric bearing communicates by adjustable eccentric linkage 67 to pin 68 pivotably mounted in bracket 69 structurally carried by a side element of the cutter bar frame at a medial position between the end bearings. Adjustable eccentric linkage 70 communicates from the rearward eccentric journal to pin 71 pivotably carried in bracket 72 structurally supported by the auxillary frame. The rearward eccentric linkage serves to aid in maintaining alignment of the cutter bar jack shaft while the forward eccentric linkage moves the side element of the cutter bar frame in a laterally reciprocating motion and by the intercommunicating linkage will transmit this motion to the cutter bar. Obviously the support of the cutter bar frame and the linkage between cutter bar frame sides and forward portion must be articulate to accomplish this motion; the exact form of articulate linkage, however, is not essential.

Vertical positioning means 13 include, preferably double acting, hydraulic cylinder 74 extending in a medial position from element 24 of the principal tractor frame to auxillary cutting member frame 41 to adjustably position the auxillary cutting member frame relative the tractor frame. The hydraulic cylinder is serviced through hydraulic line 75 from hydraulic system 26 of tractor 21. Since the tractor is relatively heavy and supported upon the earth, any relative motion of the cutter member will be reflected in a change in elevation of the cutter bar-conveyor structures relative the earth.

To aid in maintaining the elevation of the cutting and transport structures, once established, I provide spaced level maintaining wheels 76 rotatably mounted upon L-shaped axle elements 77, the upwardly projecting portions of which are movably carried for adjustably positioning in sleeves 78 having bolts 79 threadedly engaged therein to contact the axle to releasably maintain it in a predetermined position. These sleeves are structurally mounted upon level wheel support arms 80 structurally carried by cutting member auxillary frame 41. This structure may be adjusted after initial vertical positioning of the conveyor member and its auxillary structures to aid in maintaining the predetermined desired elevation of the cutting bar. It is to be noted that the cutting bar will move vertically in the same fashion as the pickup member and the forward portion of the transit conveyor by reason of the rigid mechanical linkage therebetween. If it be desired to adjust the vertical positioning between cutter bar and pickup member, this is done by adjusting the position of the cutter bar relative the cutting member frame.

Elevating conveyor 18 is carried, with its lower forwardmost part immediately rearwardly and below the rearwardmost part of transit conveyor 17, by auxillary elevating conveyor frame 81 structurally communicating with principal tractor frame 24. The auxillary frame journals forward conveyor shaft 82 in its lower part and rearward conveyor shaft 83 in its upper part. Each of these shafts carry medially positioned rolls adapted to operatively support conveyor belt 84 and the rearward shaft carries in one end part driving cog 85 adapted to aid in motivating the structure. Preferably conveyor belt 84 is of a link-chain type mounting a plurality of spaced, cooperating, outwardly projecting rubber finger 86 adapted to catch the cut asparagus spears, align them in substantial horizontal fashion and transport them to the processing area.

Sorting member 19 provides horizontally orientated sorting table 88 of some areal extent, projecting rearwardly of the rearwardmost portion of elevating conveyor 18 and preferably having some lateral extension about its sides. Preferably the table is provided with some means of maintaining cut asparagus spears thereon, such as elevated sides or some friction generating surface. The table structurally communicates with and is supported by the auxillary conveyor frame. Depending from this frame, below and laterally of the sorting table, are platforms 89 providing a place for workers to stand while operating upon cut asparagus spears upon the sorting table. Various auxillary box holding and storage structures 90 may be added as desired, but these again are well known in the asparagus harvesting art.

Motivating means 20 includes the several mechanical linkages communicating from power takeoff 25 of tractor 21 to the various functional elements of my invention to cause their operation. As seen especially in FIGS. 4 and 5 the power takeoff preferably provides rearwardly extending shaft 91 and laterally extending shaft 92, each respectively carrying driving cogs 93 and 94. Cog 93 communicates by endless roller chain 95 to cog 96 irrotatably carried by jack shaft 97 journaled in bearing 98 structurally carried by the principal tractor frame. The forward end portion of shaft 97 carries rearward universal 99 communicating through intermediate shaft 100 to forward universal 101, which in turn operatively communicates with the rearward portion of cutter jack shaft 65 to complete the power train.

Driving cog 94 communicates by endless chain 102 with cog 103 irrotatably carried by laterally extending jack shaft 104, journaled in paired opposed bearings 105 supported on the principal tractor frame. The outward portion of shaft 104 carries cog 106 communicating by endless chain 107 with driving cog 85 of rearward shaft 83 of the elevating conveyor to provide motive power thereto. Driving cog 108 is carried by shaft 104 laterally outwardly of cog 106 to communicate by endless chain 109 with cog 33 on rearward conveyor belt shaft 30. A second cog 110 on shaft 30 communicates by endless chain 111 to cog 36 on eccentric shaft 34. A second cog 112 on eccentric shaft 34 communicates by endless chain 113 to driving cog 33 carried by forward conveyor belt shaft 31. A second cog 115 on shaft 31 communicates by endless chain 114 to cog 40 carried by the shaft of the rearwardmost pickup roll 36. Each of the pickup rolls except the forwardmost have two cogs in their end parts; plural endless chains 116 communicate from one cog of a more rearward shaft to a cog of the immediately forward shaft to cause motion of that forward shaft. The forwardmost roll 38a has only one driving cog.

Having thusly described the structure of my invention, its operation may be more readily understood.

Firstly a harvester is formed according to the foregoing specifications and operatively positioned upon a wheel tractor for support, locomotion, and motivating power. The power takeoff of the tractor is activated to cause the operation of the various elements of my invention. Upon activation the elevating conveyor will commence motion with the belt moving in a rearward direction on its uppermost surface. The transit conveyor will commence operation with its belt moving in a rearmost direction on its uppermost course and the various pickup rolls will activate to rotate in a counter clockwise direction, or rearwardly (as viewed in the drawings of FIG. 5). Similarly eccentric shaft 34 of the transit conveyor will activate to rotate and cause the medial portion of the conveyor to cyclically move upward responsively. The cutter bar jack shaft will rotate upon its axis to activate eccentric journal 66 to cause forward journal linkage 67 to oscillate in a lateral direction to move the cutter bar frame in a similar oscillatory fashion; this in turn will cause the cutter bar to oscillate with small amplitude in a lateral direction.

In this condition the harvester is positioned immediately adjacent the asparagus crop desired to be harvested. Normally the crop will be arrayed in lineal rows of sorts usually some two to four feet in width. Preferably the cutter bar will be dimensioned so that it will harvest one of these rows of asparagus. When the harvester be appropriately aligned by positioning the tractor, hydraulic cylinder 74 is activated to move the cutter bar 44 into appropriate vertical position relative the surface of the earth to cut the asparagus spears at the desired depth, normally about an inch and a half below the earth surface. Level maintaining wheels 76 are then adjusted to rest upon the earth when the cutter bar be in this predetermined position so that they will tend to maintain it in this position as the cutter bar passes through the earth. Beforehand the cutter bar will have been appropriately adjusted in vertical position relative the pickup structure by adjusting the cutter bar upon cutter bar arms 49. Normally the desirable position is one with the cutter bar cutting edge substantially at or very slightly below the lowermost portion of the forwardmost pickup roll.

With harvester in this condition the tractor is activated to move along the row of asparagus to be cut at a speed of two to three miles per hour and as it does so the cutter bar will be moved forwardly along the row of asparagus and at the same time will oscillate in a lateral fashion, preferably at a rate of about 2,000 cycles per minute. As the cutter bar moves forwardly along the row of asparagus the various spears will come into contact with the cutter bar and be severed by it an inch or two below the surface of the earth. At this occurs a substantial portion of the earth above the point of severance and the various severed asparagus spears will pass rearwardly over the cutter bar and over the forwardmost of the pickup rolls. The earth supported cut asparagus will similarly move rearwardly in turn along the upper surfaces of the several pickup rolls by reason of the rotary motion of the rolls. This action is enhanced by the linear protuberances of the rolls. Not all soil will pass in this fashion. Some soil will pass downwardly between the pickup rolls by action of gravity but enough will remain to form a protective bed for the supported asparagus spears. As the cut spears and supporting earth pass rearwardly over the rearwardmost pickup roll, the whole will be deposited upon the forwardmost portion of transmiting conveyor 17. Since this conveyor has an open mesh-like nature, the supporting earth will pass downwardly therethrough and be deposited upon the surface beneath the harvester. The then horizontal asparagus spears, however, are too large to pass through the holes in the screen and will move rearwardly along the conveyor belt in response to its motion. If there be any clods or larger agglomerations of dirt that do not pass through the screen normally, they will tend to be broken up by the action of eccentric roll 35.

As the cut asparagus spears move to the rearwardmost portion of transit conveyor 17, they will pass over its rearwardmost part and be deposited upon the lower forward part of elevating conveyor 18 where they will be caught by the row arranged, substantially horizontal projecting fingers 86 to be substantially horizontally aligned perpendicularly to the fingers and moved thereby in response to elevating conveyor motion to sorting table 88 where they are deposited manually or by action of gravity for further processing according to the asparagus harvesting art.

In this fashion then my asparagus cutter may harvest many acres of asparagus in a day whereas a laborer normally cannot manually harvest more than three to five acres of asparagus in a day. The exact amount of asparagus that may be harvested depends upon many parameters which vary with particular areas, particular asparagus crops and farming methods but in the northwestern area of the United States it has been found that my mechanism in the single row form may harvest up to twenty acres in a day with one tractor driver and two workmen sorting and packing the harvested crop. Twenty-four hour use can substantially increase the harvestable acreage.

From the foregoing description it is to be particularly noted that the cutting bar will move laterally in an oscillatory fashion at a fairly rapid rate. Friction will be generated in the particulated earth through which it passes and by reason of this motion the friction will result in some abrasion of the cutter bar surface by the adjacent earth particles which will have a sharpening action upon the cutter blade by reason of its acute crenate configuration. In fact, the more abrasive the soil through which the cutter bar passes, the sharper it remains and the more effective its cutting action.

It is further to be noted that the conveyor and associated mechanism may be minutely adjusted relative the surface of the earth by means of the hydraulic communication between this structure and the tractor and that this relationship will be maintained by the level maintaining wheels over relatively small areas of irregular, undulating topography.

It is further to be noted that my harvester may be used in conjunction with various vehicles other than a tractor or, in fact, self-propelled. The harvesting mechanism similarly may be pluralized on one supporting vehicle.

The foregoing description of my ivention is necessaryily of a detailed nature so that a specific embodiment of it might be set forth as required, but it is to be understood that various modifications of detail, rearrangement and multiplication of parts may be resorted to without departing from its spirit, essence or scope.

Having thusly described my invention, what I desire to protect by Letters Patent, and

What I claim is:

1. An asparagus harvester of the nature aforesaid, supported on a vehicle for locomotion and activation, comprising, in combination:

an elongate transit conveyor pivotably mounted upon the rearward part of the supporting vehicle and extending forwardly therebeneath to the medial part thereof, the conveyor having a peripheral frame rotatably mounting rollers at least in its end parts to movably carry a mesh conveyor belt;

a pickup member, carried by and extending forwardly of the transit conveyor, including a plurality of axially aligned, adjacent rollers, with rearwardly increasing diameters, each roller having a plurality of angularly spaced elongate intermeshing ridges on its surface, and all rollers adapted to be rotated to transport material rearwardly across the upper surfaces thereof to the transit conveyor;

a cutting member, adjustably carried by the forward part of the transit conveyor, having an elongate, laterally extending, crenate cutting bar depending forwardly of the pickup member for oscillatory motion in a lateral direction;

first means of adjustably, vertically moving the forward part of the transit conveyor relative to the supporting vehicle and second means of maintaining the vertical position of the forward part of the transit conveyor relative to the surface of the earth; and means of activating the mechanical elements of the harvester in response to power supplied by the supporting vehicle.

2. The invention of claim 1 having an elevating conveyor extending from the rearward part of the transit conveyor rearwardly and upwardly to transport cut asparagus spears to a sorting table carried by the tractor in its rearward part for further processing.

3. The invention of claim 1 wherein the cutting member comprises:

an auxiliary frame, supporting upon the transit conveyor frame, pivotably mounting spaced, opposed side elements pivotably mounting a forward cutter bar frame having spaced depending cutter bar arms adjustably communicating for vertically positioning with the elongate, crenate cutter bar; and at least one eccentric bearing mounted on the transit conveyor frame with eccentric linkage communicating from the eccentric ace of the bearing to the auxiliary frame to cause laterally oscillating motion in the auxiliary frame responsive to propelling power furnished by the supporting vehicle.

4. The invention of claim 1 wherein the first means of adjustably, vertically moving the forward part of the transit conveyor comprise:

a hydraulic cylinder depending from a medial part of the tractor frame to a medial forward part of the transit conveyor frame to adjustably determine the distance therebetween.

5. The invention of claim 4 wherein the second means of maintaining the vertical position of the forward part of the transit conveyor relative to the surface of the earth comprise:

paired opposed earth supported wheels carried on each side of the forward part of the transit conveyor in adjustable mountings to allow adjustable vertical position of the wheels relative to transit conveyor.

6. The invention of claim 1 further characterized by:

the cutter bar being positioned vertically below the upper surface of the forwardmost pickup roll so that as the harvester moves forwardly in operative position cut asparagus spears are picked up on a bed of earth by the forward pickup rolls and initially transported upon the supporting bed of earth.

7. The invention of claim 1 further characterized by:

an eccentric roller irrotatably carried on a shaft rotatably journaled in the medial part of the transit conveyor frame between belt carriers to cyclically move the upper course of the transit conveyor belt upwardly upon rotation of aid in removing any agglomerated dirt through the conveyor belt; and mechanical linkage to rotate the shaft responsive to rotary motion of the power take-off of the mounting tractor.

\* \* \* \* \*